3,478,683
SAFETY CREDIT CARD CONSTRUCTION
Arnold R. Hopkins, P.O. Box 276, Sandoval, Ill. 62882, and Leo J. Pindjak, R.R. 3, Flora, Ill. 62839
Filed June 5, 1967, Ser. No. 643,611
Int. Cl. B41n 1/00; G09f 3/02
U.S. Cl. 101—368               15 Claims

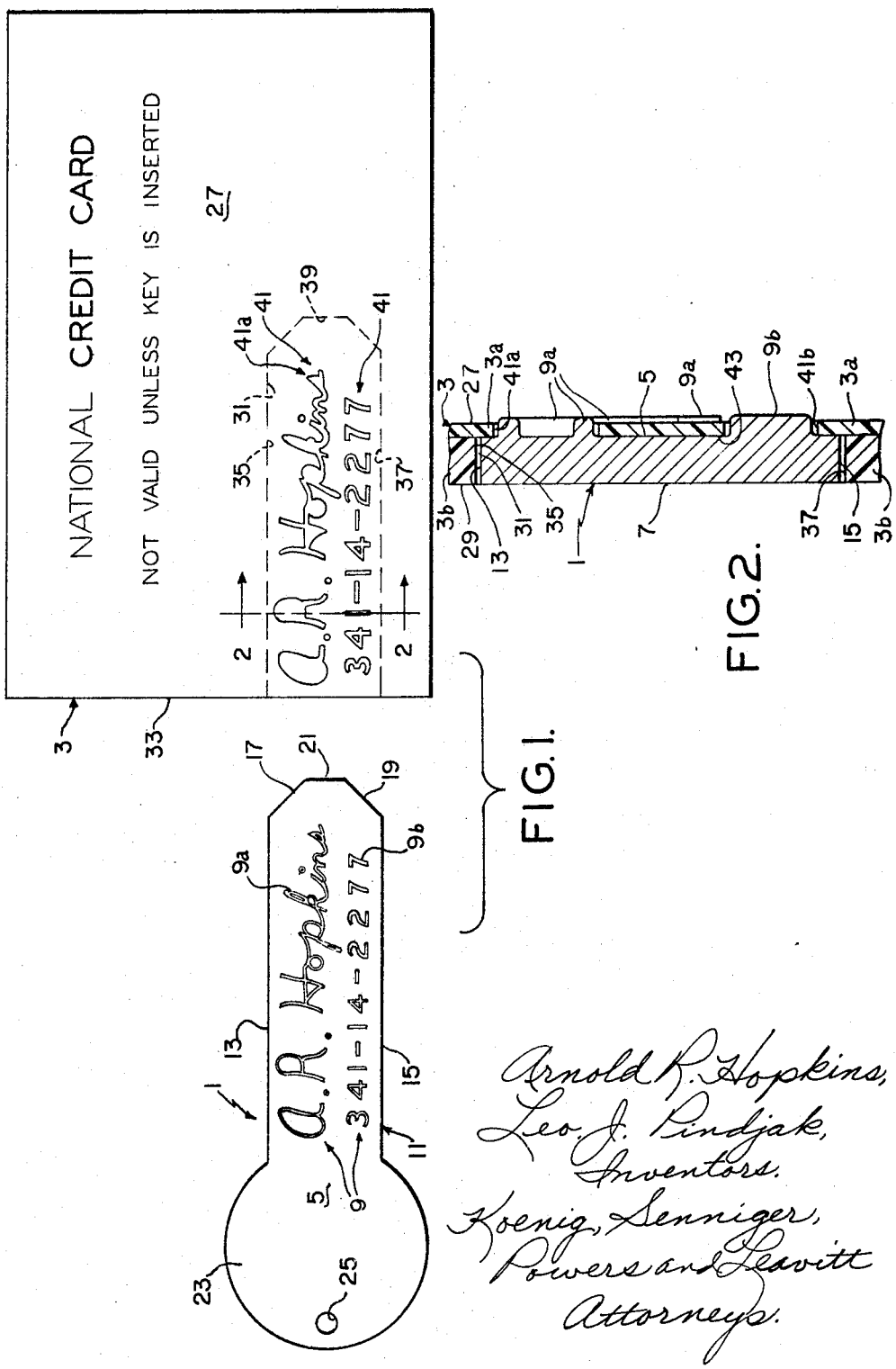

ABSTRACT OF THE DISCLOSURE

A key and a card are used in combination for imprinting on a charge ticket or the like. The key contains raised indicia comprising a facsimile of the signature and the identifying number of the person authorized to use the card. There are openings through the front face of the card corresponding to the key indicia which permit the indicia on the key to project through the openings for imprinting the indicia on a charge ticket or the like. The key and the corresponding card parts are used in combination with each other; neither can be used with a part of another credit card construction.

Background of the invention

Credit cards are used in lieu of cash or checks for charging services and goods in many commercial establishments. These cards are often lost, misplaced or stolen and the owner of the card or an insurer is often obligated to pay any charges made by an unauthorized person using the card. Some credit cards entitle the holder to substantially unlimited credit for a wide variety of goods, services and even cash or traveler's checks. Therefore the potential liability from misappropriation of a card can be quite substantial.

Summary of the invention

Among the objects of the invention may be noted the provision of a safety credit card construction which cannot be used to incur charges to the owner's account in the event a card part normally carried in the billfold or wallet is lost and which therefore reduces the possibility of fraudulent use.

A safety credit card construction of the invention comprises a two-faced plane of material having a socket therein. Openings in the form of indicia indicating ownership extend from the socket and through a first face of the plane of material. A separable key for insertion into said socket carries corresponding raised indicia for registration with and extension through said openings to provide exposure at said one face for printing. The socket and key have outlines to accommodate the key for registration.

Brief description of the drawings

FIG. 1 is an exploded view showing the two parts of a safety credit card construction of the invention; and FIG. 2 is an enlarged section taken on line 2—2 of FIG. 1 showing the two parts assembled for imprinting on a charge ticket.

Corresponding reference characters indicate corresponding parts throughout the several views of the drawings.

Description of the preferred embodiment

A safety credit card made according to the invention comprises a key 1 and a flat card 3. The key has a front face 5 and a back face 7. The face 5 contains indicia generally designated 9 which are embossed or otherwise raised above surface 5. In the embodiment illustrated, the indicia comprise a facsimile signature 9a and a series of numbers 9b which jointly identify the person authorized to use the safety credit card construction. However other forms such as groups of dots, lines or other identifying means can be used instead of the combination of signature and numbers shown in the drawings. The use of the facsimile signature of the person authorized to sign for charges is desirable. Numerical indicia 9b can be an identification number assigned by the company issuing the card construction or it can be some other number specifically identifying the person authorized to use the card construction, such as the person's Social Security number. The indicia on the key and the mating openings in the card (described later) are unique for the credit card construction issued to any particular person so that either part of the credit card construction can be used only with the other part of the same credit card construction. The indicia can be formed on the key by any suitable technique.

The indicia 9 are preferably located on the projecting end portion 11 of the key 1. Portion 11 comprises spaced and generally parallel side edges 13 and 15 which meet inclined end edges 17 and 19, respectively. The inclined edges are joined by an end 21 perpendicular to the sides. The key has the usual finger-hold portion 23 which preferably has a hole 25 therethrough in spaced relation to the indicia for attaching the key to a suitable key holder, if desired.

The card 3 is a two-faced plane of material having a front face 27 and a back face 29 which are substantially parallel to one another. A channel-shaped recess 31 in the back face forms a socket which extends inwardly from one edge 33 of the card. The recess has spaced side edges 35 and 37 and an end 39. The outline of the recess is conjugate with or corresponds to the end portion 11 of the key. The recess is substantially the same length as end portion 11 of the key and is slightly wider than the key as shown in FIG. 2 to permit the key end 11 to be easily inserted into the recess.

The card has a series of openings generally designated 41 between the bottom 43 of the recess and the front face 27 of the card. The pattern of the openings is conjugate with or corresponds in shape and arrangement to the indicia 9 on the key. Thus the upper line of openings designated 41a corresponds to the signature indicia 9a and the lower row of openings 41b corresponds to the identifying number indicia 9b on the card. Referring to FIG. 2, the openings are preferably slightly larger in size than the respective portions of the indicia 9 so that the indicia may be easily inserted through the openings when the key is placed in the recess. The height of the indicia above key face 5 is slightly greater than the thickness of the card between the front face 27 and the bottom 43 of the recess. Because of this relation in thickness, the indicia 9 project entirely through the holes and above the surrounding portions of face 27 when the key is properly aligned in the recess 31. This permits a charge ticket or the like placed against the front face 27 of the card to engage indicia 9 so that the charge ticket can be imprinted by pressing it against the indicia 9 or by passing the indicia 9 against the charge ticket. It will be understood that embossed indicia can be provided on face 27 of the card in the usual manner for imprinting other desired information on the charge ticket, such as the name of the credit card company, expiration of the card, a credit rating, et cetera. Other unembossed printing may also be applied to the face 27.

The card 3 is preferably manufactured from laminated sheets of material bonded together in face-to-face relation. As shown in FIG. 2, the card comprises a sheet 3a having its back face bonded to the front face of a somewhat thicker sheet 3b. The holes or openings 41 are formed entirely in the sheet 3a and this may be done prior to or after lamination of the sheets. The recess 31 is formed entirely in the sheet 3b. This facilitates manufacture of the card by permitting the recess to be cut as a slot or hole in sheet 3b before the sheets are bonded together. The sheets can be bonded together by adhesives or by pressing them together under heat and pressure when they are formed of suitable plastic materials.

The safety credit card construction of the invention is used for imprinting on a charge ticket by placing the card 3 in the printing machine or device with the key end portion 11 in recess 31 and with the embossed indicia projecting through openings 41 in the card. A charge ticket (not shown) is placed against face 27 of the card and the imprinting machine presses the ticket against the raised indicia to impress the name and other identifying indicia 9 onto the charge ticket.

The card 3 is preferably carried separately from the key in a billfold or wallet. Both parts of the safety credit card construction must be used together in the manner described in order properly to incur charges to the account. Also, one part of the credit card construction cannot be used with another part of another card construction since the indicia 9 and openings 41 are not identical on any two credit card constructions.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus to imprint credit information comprising a two-faced plane of material having a socket therein, openings shaped as identifying indicia and extending from the socket and through a first face of the plane of material, a separable member for insertion into said socket and carrying raised indicia for registration with and extension through said openings to provide exposure at said one face for imprinting, said socket and separable member having outlines to accommodate the key for said registration.

2. Apparatus according to claim 1, wherein said socket extends into said plane of material from its other face, whereby the separable member tends to separate from the plane of material when they are not in a registered position for imprinting.

3. Apparatus according to claim 1, wherein the outlines of said openings and said raised indicia are conjugate and the outlines of said key and socket are also conjugate.

4. Apparatus according to claim 3, wherein said socket extends into said plane of material from its other face.

5. A safety credit card construction, comprising a key member having an elongate end portion, raised indicia on one face of said end portion identifying the person authorized to use the credit card construction, a card having a front face and a back face, the card having a generally channel-shaped recess in the back face extending inwardly from one edge of the card, the outline of the recess substantially corresponding in outline to the end portion of the key member, the card having a group of openings between the bottom of said recess and the front face of the card arranged in a pattern substantially corresponding in shape and arrangement to said indicia on the key member to accept the indicia so that said portion of the key containing the indicia can be placed in the recess with the indicia thereon projecting into the openings, the height of the indicia being such as to project above the surrounding portion of the front face of the card when the key is located in the recess, whereby a charge ticket or the like can be imprinted with the indicia projecting through said holes by contacting the ticket and the indicia and pressing them together.

6. A safety credit card construction according to claim 5 wherein the total thickness of the key member is at least equal to the thickness of the card.

7. A safety credit card construction according to claim 6 wherein said indicia on the key comprise the facsimile signature of the person authorized to use the credit card construction.

8. A safety credit card construction according to claim 6 wherein the indicia comprise arbitrary signs identifying the person authorized to use the credit card construction.

9. A safety credit card construction according to claim 5 wherein the card comprises two sheets of laminated materials bonded together in face-to-face relation, one sheet comprising the front part of the card and containing said openings, the other sheet containing a slot forming said recess.

10. A credit card for use with a key having raised indicia on one face of an end portion thereof for identifying the person authorized to use the credit card, the card comprising a front face and a back face, the card having a recess in the back face extending inwardly from one edge of the card, the outline of the recess formed by the sides and closed end of the recess substantially corresponding in outline to the end portion of the key containing said indicia, the card having a series of openings between the bottom of said recess and the front face of the card arranged in a pattern substantially corresponding in shape and arrangement to said indicia on the key whereby a charge ticket or the like can be imprinted by placing said portion of the key containing the indicia in the recess with the indicia thereon projecting into the openings, and placing the ticket against the front face of the card and pressing the indicia and the ticket together.

11. A credit card according to claim 10 wherein the outline of part of the openings is in the shape of the signature of the authorized user of the card.

12. A credit card according to claim 10 wherein the outline of part of the openings is in the shape of a number for identifying the authorized user of the card.

13. A credit card according to claim 10 wherein the card comprises two sheets of materials bonded together in face-to-face relation, one sheet comprising the front part of the card and containing said openings, the other sheet containing a slot having substantially the same outline as said recess.

14. Apparatus for transferring credit information to a sheet or the like comprising a card having one or more openings, said openings extending through the card, a separable member carrying raised portions for assembly with the card by registration with said openings, guidance thereby and extension therethrough, said raised portions being of height to provide exposure of the raised portions adjacent one face of the card, whereby the information is transferable to a sheet or the like by pressing the assembly toward it.

15. Apparatus according to claim 14 wherein said separable member is in the form of a key having a finger-grip portion and a substantially plane portion extending therefrom carrying said raised portions on one side and being substantially flat on its other side.

References Cited

UNITED STATES PATENTS

| | | | |
|---|---|---|---|
| 2,935,941 | 5/1960 | Bradford | 101—369 |
| 3,283,713 | 11/1966 | Wooster | 101—369 |
| 3,287,839 | 11/1966 | Rotwein et al. | 287—7 |
| 3,350,800 | 11/1967 | Witt et al. | 40—2.2 |

ROBERT E. PULFREY, Primary Examiner

E. H. EICKHOLT, Assistant Examiner

U.S. Cl. X.R.

40—2.2, 330; 101—395

PO-1050
(5/69)

UNITED STATES PATENT OFFICE
CERTIFICATE OF CORRECTION

Patent No. 3,478,683        Dated November 18, 1969

Inventor(s) Arnold R. Hopkins et al.

It is certified that error appears in the above-identified patent and that said Letters Patent are hereby corrected as shown below:

Column 2, line 43, "on the card" should read "on the key"; line 56, "9 or by passing" should read "9 or by pressing". Column 3 line 41, "the key for said" should read "the separable member for said"; line 50, "said key and" should read "said separable member and". Column 4, line 29, "key" should read "key,"; line 33, "placing" should read "by placing".

SIGNED AND
SEALED
JUN 2 1970

(SEAL)
Attest:

Edward M. Fletcher, Jr.
Attesting Officer

WILLIAM E. SCHUYLER, JR.
Commissioner of Patents